United States Patent
Bushby (10) Patent No.: US 11,759,058 B2
(45) Date of Patent: Sep. 19, 2023

(54) SHAKER DEVICES

(71) Applicant: Boca Delray Holdings, LLC, Boca Raton, FL (US)

(72) Inventor: Brayton Bushby, San Diego, CA (US)

(73) Assignee: Boca Delray Holdings, LLC, Boca Raton, FL (US)

( * ) Notice: Subject to any disclaimer, the term of this patent is extended or adjusted under 35 U.S.C. 154(b) by 161 days.

(21) Appl. No.: 16/850,877

(22) Filed: Apr. 16, 2020

(65) Prior Publication Data

US 2020/0352395 A1   Nov. 12, 2020

Related U.S. Application Data (60) Provisional application No. 62/844,131, filed on May 7, 2019.

(51) Int. Cl.
| | | |
|---|---|---|
| *A47J 43/27* | (2006.01) | |
| *B65D 51/32* | (2006.01) | |
| *B01F 33/501* | (2022.01) | |
| *B01F 101/06* | (2022.01) | |

(52) U.S. Cl.
CPC .......... *A47J 43/27* (2013.01); *B01F 33/5011* (2022.01); *B65D 51/32* (2013.01); *B01F 2101/06* (2022.01)

(58) Field of Classification Search
CPC ..... A47J 43/27; B01F 2101/06; B01F 33/254; B01F 33/5011; B01F 33/50111; B01F 35/32021; B65D 51/32
USPC ................................. 220/568; 366/130, 260
See application file for complete search history.

(56) References Cited

U.S. PATENT DOCUMENTS

| | | | | |
|---|---|---|---|---|
| 1,060,419 | A * | 4/1913 | Benjamin | B01F 33/5011 |
| | | | | D7/300.1 |
| 1,201,284 | A * | 10/1916 | Gilchrist | A47J 43/27 |
| | | | | 99/452 |
| 2,752,971 | A * | 7/1956 | Earls | A47J 43/27 |
| | | | | 215/11.1 |
| 2,858,639 | A * | 11/1958 | Lawrence | A63H 33/28 |
| | | | | 446/16 |
| 3,818,627 | A * | 6/1974 | Lebensfeld | A63H 33/28 |
| | | | | 446/15 |
| 3,913,895 | A | 10/1975 | De | |
| 6,332,704 | B1 * | 12/2001 | Gasser | A47J 43/27 |
| | | | | 366/130 |
| 6,379,032 | B1 | 4/2002 | Sorensen | |
| 6,652,345 | B1 * | 11/2003 | Lin | A63H 1/30 |
| | | | | 446/15 |
| 6,688,935 | B1 * | 2/2004 | Lin | A63H 33/28 |
| | | | | 446/16 |
| 6,908,358 | B2 * | 6/2005 | Lin | A63H 33/28 |
| | | | | 446/16 |

(Continued)

OTHER PUBLICATIONS

International Search Report dated Jun. 25, 2020 for PCT/US2020/028563.

*Primary Examiner* — David L Sorkin
(74) *Attorney, Agent, or Firm* — Christopher M. Ramsey; GrayRobinson, P.A.

(57) ABSTRACT

A shaker device can include a cap configured to be resiliently fit around at least a portion of a container to seal an opening of the container and to engage the cap to the container to hold the cap to the container. The shaker device can include a mixing stalk attached to the cap and configured to hang into the container when the cap is sealing the opening of the container.

14 Claims, 6 Drawing Sheets

(56) References Cited

U.S. PATENT DOCUMENTS

| | | | | |
|---|---|---|---|---|
| 8,196,905 | B2* | 6/2012 | Bodum | A47J 43/1093 |
| | | | | 261/DIG. 26 |
| 9,706,880 | B1* | 7/2017 | Kalamaras | A47J 43/27 |
| 11,103,108 | B2* | 8/2021 | Mager | B01F 33/50111 |
| 2003/0041739 | A1 | 3/2003 | Cai | |
| 2006/0021512 | A1 | 2/2006 | Ghidini | |
| 2006/0250887 | A1* | 11/2006 | Vernon | B01F 35/32021 |
| | | | | 366/130 |
| 2010/0308048 | A1 | 12/2010 | Milkowski et al. | |
| 2013/0279287 | A1* | 10/2013 | Cerasani | A47J 43/27 |
| | | | | 366/130 |
| 2014/0119154 | A1* | 5/2014 | Kershaw | B01F 31/441 |
| | | | | 366/130 |
| 2015/0290605 | A1* | 10/2015 | Dayton | B01F 33/50111 |
| | | | | 366/130 |

* cited by examiner

SHAKER DEVICES

CROSS-REFERENCE TO RELATED APPLICATIONS

This application claims priority to and the benefit of U.S. Provisional Application No. 62/844,131, filed May 7, 2019, the entire contents of which are herein incorporated by reference in their entirety.

FIELD

This disclosure relates to shaker devices (e.g., for mixing ingredients).

BACKGROUND

There are a variety products on the market to help with mixing of ingredients (e.g., liquids, powders, etc.), particularly in the kitchen category. The types of ingredients being mixed include, for example, flavoring for drinks, exercise supplements for working out, cooking mixes, dressings, and otherwise. Mixing can be done with a variety of methods including stirring, whisking, and shaking, either manually or electronically. Some methods are hand-held and some are hands-free. The variety of products for mixing include, for example, traditional eating utensils like a spoon, whisks, blenders, electric stirrers, shaker bottles, and more.

Shaker bottles are typically used for exercise drinks, like protein, branched chain amino acids (BCAAs), or pre/post workout supplements, but can also be used to mix dressings and cooking mixes. The method of mixing by the shaker bottle is to blend the various ingredients by shaking the entire enclosed product. To do this the shaker bottle requires a cup, a top which seals onto the cup, and typically an object on the inside to blend the ingredients. This object is typically a ball, of various shapes and sizes, or a screen to which the ingredients & liquid move through. Typically, the ball is free to move around the inside of the shaker bottle, while the screen typically secures to the upper part of the shaker bottle.

Traditional shaker bottles can be effective, but are usually large, complex, difficult to clean, lack portability, take up storage space, and require the use of a single, proprietary cup to function. Such conventional methods and systems have generally been considered satisfactory for their intended purpose. However, there is still a need in the art for improved shaker devices. The present disclosure provides a solution for this need.

SUMMARY

In accordance with at least one aspect of this disclosure, a shaker device can include a cap configured to be resiliently fit around at least a portion of a container to seal an opening of the container and to engage the cap to the container to hold the cap to the container. The shaker device can include a mixing stalk attached to the cap and configured to hang into the container when the cap is sealing the opening of the container.

The cap can include one or more sidewalls configured to deform around and resiliently engage a lip of the container to seal against an exterior side wall of the container, and a top portion connected to the one or more sidewalls to form a cup shape. The one or more sidewalls can be made of the elastic material. In certain embodiments, the cap can be entirely made of the elastic material. In certain embodiments, the one or more sidewalls can include a cylindrical sidewall and the top portion includes a disc.

The mixing stalk can be connected to the top portion. In certain embodiments, the mixing stalk can be made of the elastic material.

The mixing stalk can be shaped to allow elastic deformation of at least a portion of the mixing stalk in an axis of vibration to cause the mixing stalk to stretch further into the container when the container is shaken to create a reciprocating extension and retraction of the mixing stalk. For example, the mixing stalk can include a base portion extending from the cap, a neck portion extending from the base portion, and an end portion extending from the neck portion. The base portion can be a conical member extending downward from the top portion of the cap. The neck can be thinner than the base portion and the end portion can define a loop shape. Any other suitable mixing stalk is contemplated herein.

In certain embodiments, the shaker device can include a mixing effector attached to or extending from the mixing stalk. In certain embodiments, the mixing effector can be a metallic wire mixing ball. In certain embodiments, the mixing effector is tied to the mixing stalk. Any other suitable mixing effector and/or attachment type is contemplated herein.

In certain embodiments, the shaker device can include one or more tabs extending outwardly from the one or more sidewalls to facilitate engaging the cap to the container. Any other suitable additional features are contemplated herein. The elastic material can be or include at least one of silicone, rubber, or nitrile. Any other suitable material(s) (e.g., elastic, semi-rigid, or rigid) for any suitable portion of any embodiment of the shaker device is/are contemplated herein.

In accordance with at least one aspect of this disclosure, in certain embodiments, a shaker device can include an elastic cap having an integral elastic mixing stalk extending therefrom. The elastic mixing stalk can be configured to attach to a mixing effector. The mixing effector can be attached to the mixing stalk.

In accordance with at least one aspect of this disclosure, a method can include stretching an elastic cap over a lip of a container such that the elastic cap is engaged to and seals an opening of the container and such that a mixing stalk attached to the cap and a mixing effector attached to the mixing stalk is inserted into the container. The method can include shaking the container having the elastic cap engaged to the container to mix contents in the container. The method can include using the mixed contents.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
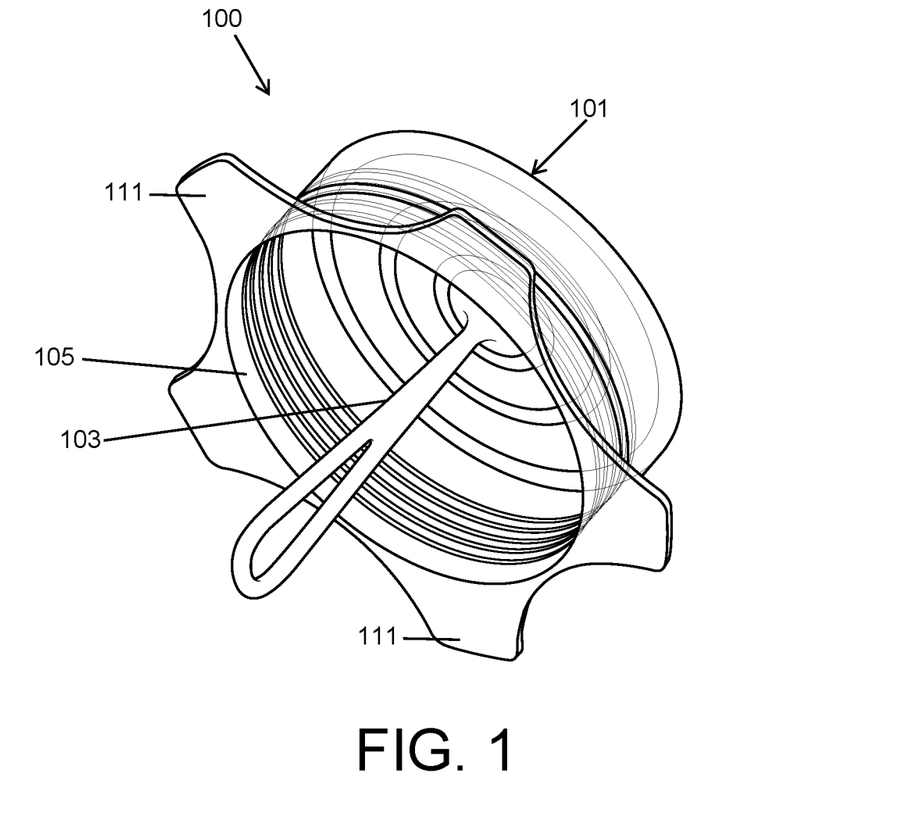
FIG. 1 is a perspective view of an embodiment of a shaker device in accordance with this disclosure.

Reference will now be made to the drawings wherein like reference numerals identify similar structural features or aspects of the subject disclosure. For purposes of explanation and illustration, and not limitation, an illustrative view of an embodiment of a shaker device in accordance with the disclosure is shown in FIG. 1 and is designated generally by reference character 100. Other embodiments and/or aspects of this disclosure are shown in FIGS. 2-8.

Figure 3:
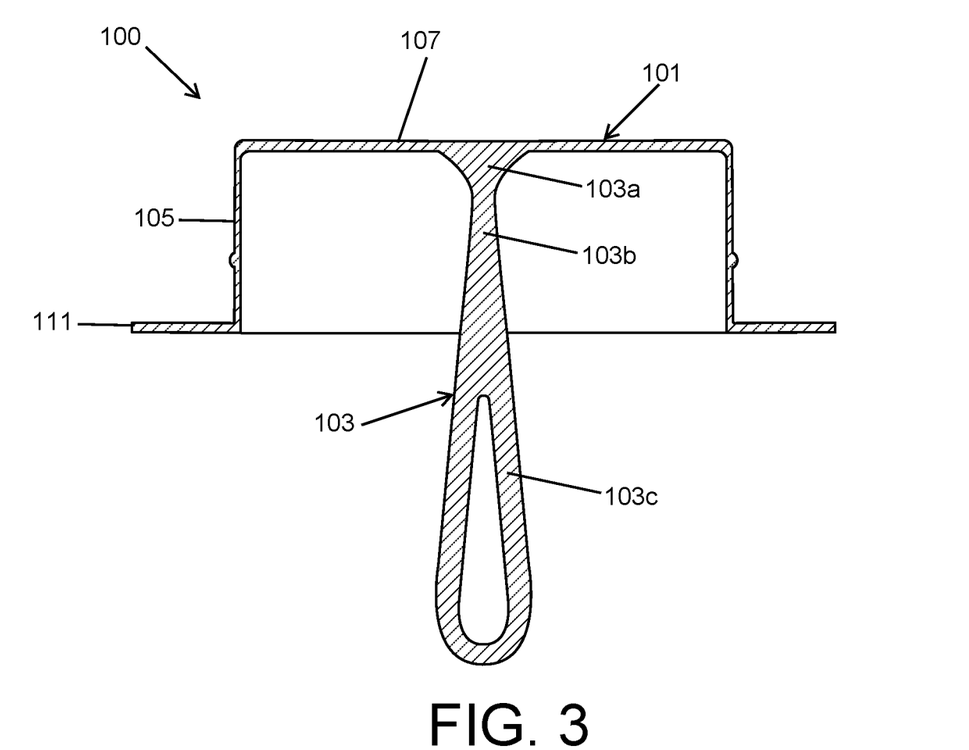
FIG. 3 is a cross-sectional elevation of the embodiment of FIG. 1.
Figure 4:
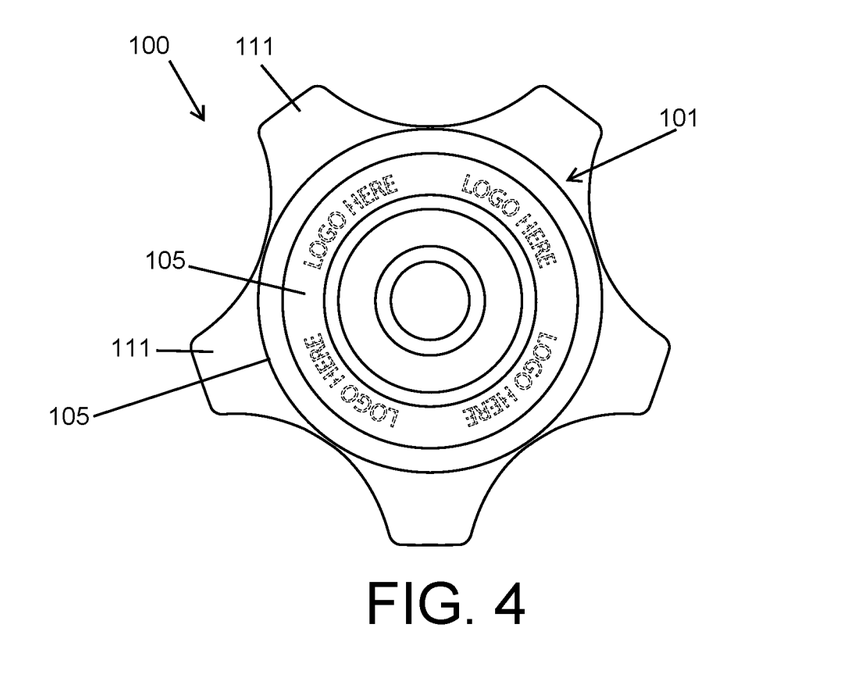
FIG. 4 is a plan view of the embodiment of FIG. 1.
Figure 6:
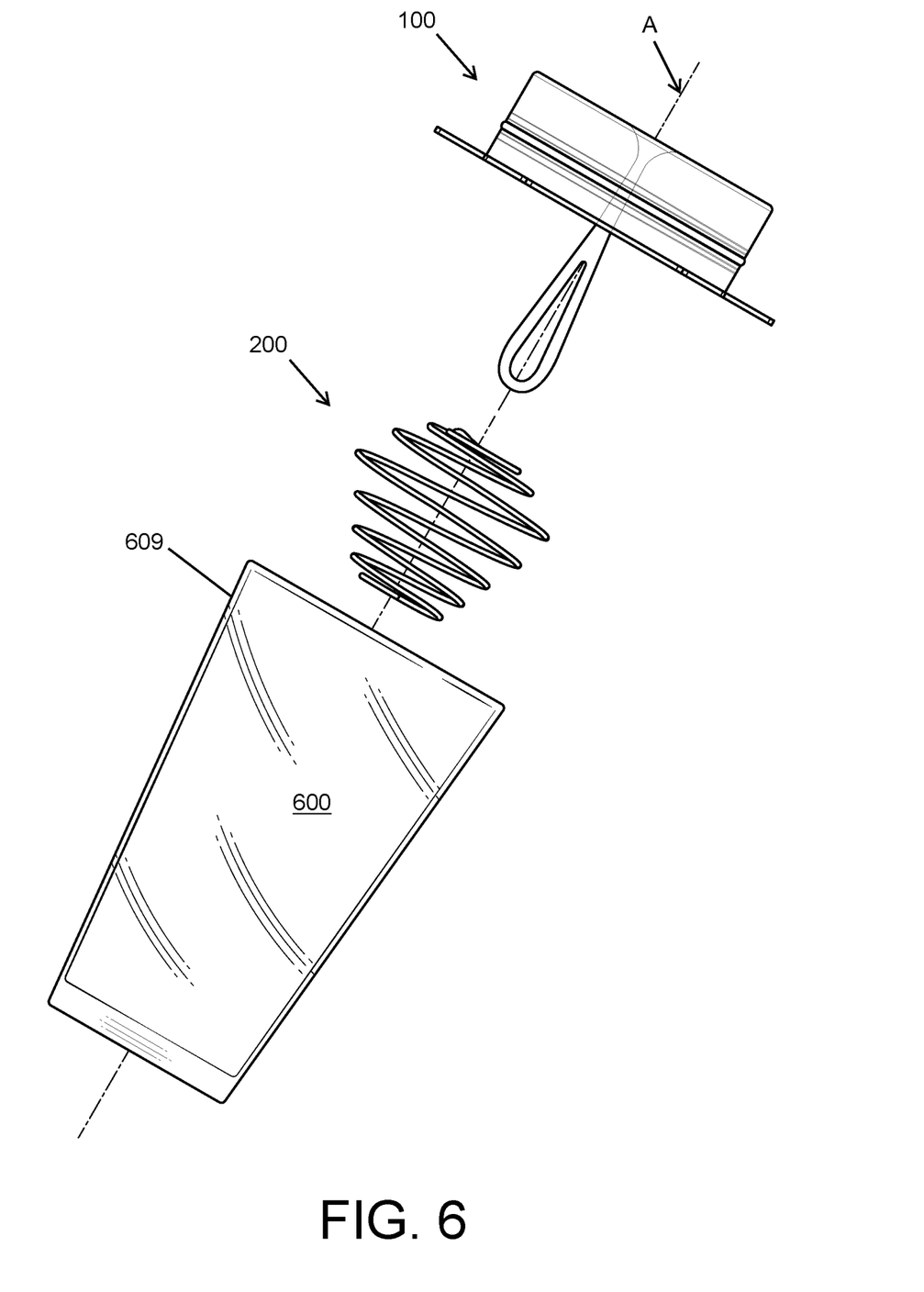
FIG. 6 is an exploded view of the embodiment of FIG. 5, shown with a container.
Figure 7:
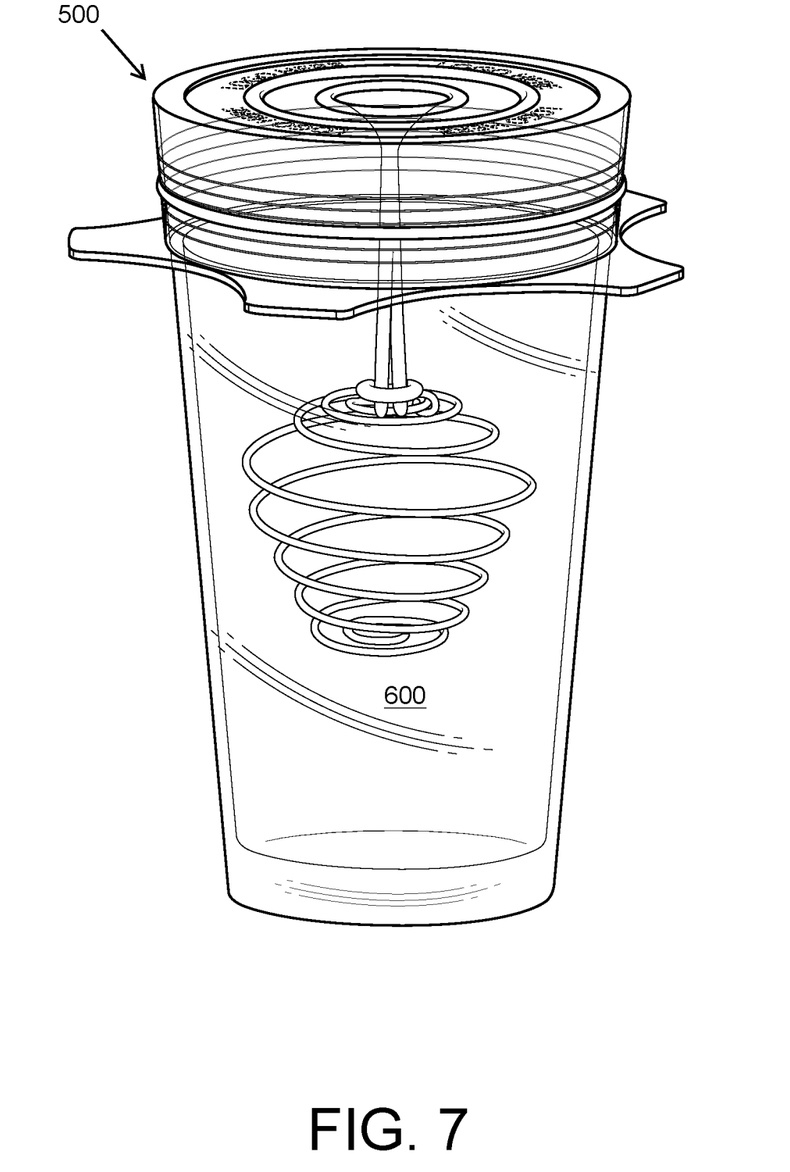
FIG. 7 is a perspective view illustrating the embodiment of FIG. 5 attached to the container of FIG. 6.
Figure 8:
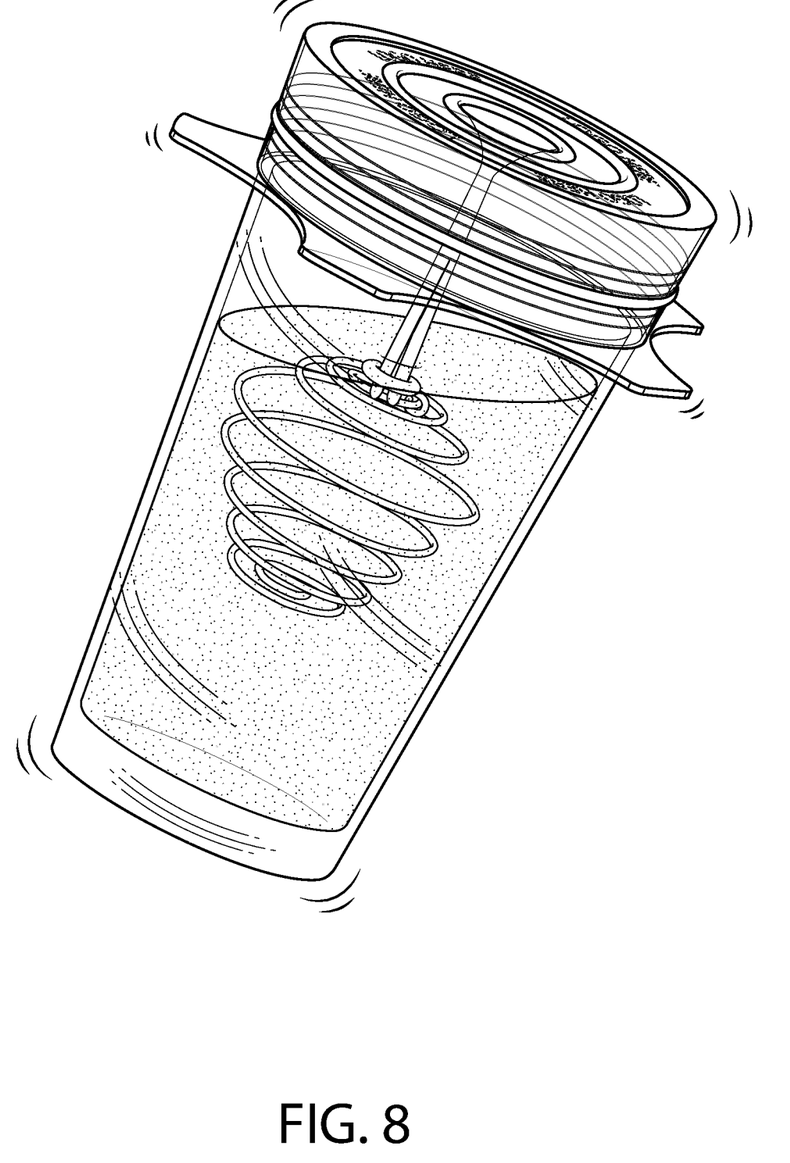
FIG. 8 is a perspective view of the embodiment of FIG. 6, shown being shaken and mixing the contents of the container.

Referring to FIGS. 1, 3, and 4, in accordance with at least one aspect of this disclosure, a shaker device 100 can include a cap 101 configured to be resiliently fit around at least a portion of a container (e.g., a rigid cup as shown in FIGS. 6-8) to seal an opening of the container and to engage the cap 101 to the container to hold the cap 101 to the container. The shaker device 100 can include a mixing stalk 103 attached to the cap 101. The mixing stalk 103 can be configured to hang into the container when the cap 101 is sealing the opening of the container.

The cap 101 can include one or more sidewalls 105 configured to deform around and resiliently engage a lip of the container to seal against an exterior side wall (e.g., outer wall 609 as shown in FIG. 6) of the container. The cap 101 can include a top portion 107 connected to the one or more sidewalls 105 to form a cup shape. The one or more sidewalls 105 can be made of the elastic material. In certain embodiments, e.g., as shown, the cap 100 can be entirely made of the elastic material. In certain embodiments, e.g., as shown, the one or more sidewalls 105 can include a cylindrical sidewall and the top portion 107 can include a disc. Any other suitable shape(s) (e.g., square, rectangular, triangular, etc.) for any suitable application are contemplated herein.

The mixing stalk 103 can be connected to the top portion 107. In certain embodiments, the mixing stalk 103 can be connected to the one or more sidewalls 105. Any other suitable construction is contemplated herein.

In certain embodiments, the mixing stalk 103 can be made of the elastic material. For example, the mixing stalk 103 can be integrally formed with the top portion 107 and/or the one or more sidewalls 105 such that the cap 101 and the mixing stalk 103 form a single piece. In certain embodiments, the mixing stalk 103 can be semi-rigid or rigid, and can be connected to the cap 101 in any suitable manner. In certain embodiments, the top portion 107 can be semi-rigid or rigid (e.g., made of hard plastic, metal, etc.) and can be suitably connected to one or more elastic sidewalls 105 and/or an elastic, semi-rigid, rigid mixing stalk 103 in any suitable manner to be functional as disclosed herein. In certain embodiments, e.g., as shown, the top portion 107 can flex inwardly and outwardly during shaking, providing relative motion of the mixing stalk 103 to the one or more sidewalls 105 and/or the top portion 107.

In certain embodiments, the mixing stalk 103 can be configured to move relative to the cap 101 or at least a portion thereof when engaged to a container. In certain embodiments, the mixing stalk 103 can be shaped (and/or otherwise configured) to allow elastic deformation of at least a portion of the mixing stalk 103 in an axis of vibration (e.g., axis A as shown in FIG. 6) to cause the mixing stalk to stretch 103 further into the container when the container is shaken to create a reciprocating extension and retraction of the mixing stalk 103. The mixing stalk 103 can be configured to bend and/or otherwise move relative to the cap 101 in any suitable manner.

The mixing stalk 103 can include a base portion 103a extending from the cap 101 (e.g. from the top portion 107), a neck portion 103b extending from the base portion 103a (e.g., going from thinner to thicker as shown), and an end portion 103c extending from the neck portion 103b. The base portion 103a can be a conical member extending downward from the top portion 107 of the cap 101. The neck 103b can be thinner than the base portion 103a and the end portion can define a loop shape 103c, for example. Any other suitable mixing stalk is contemplated herein.

Figure 2:
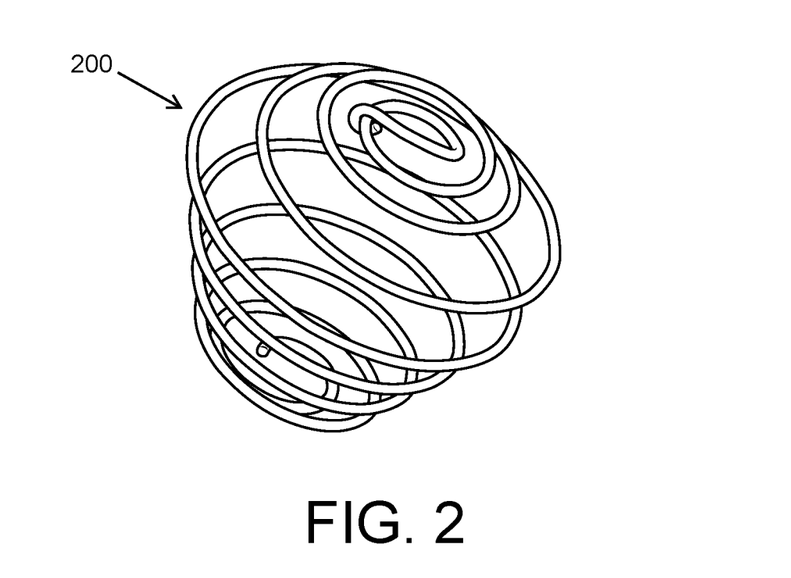
FIG. 2 is a perspective view of an embodiment of a mixing effector in accordance with this disclosure.
Figure 5:
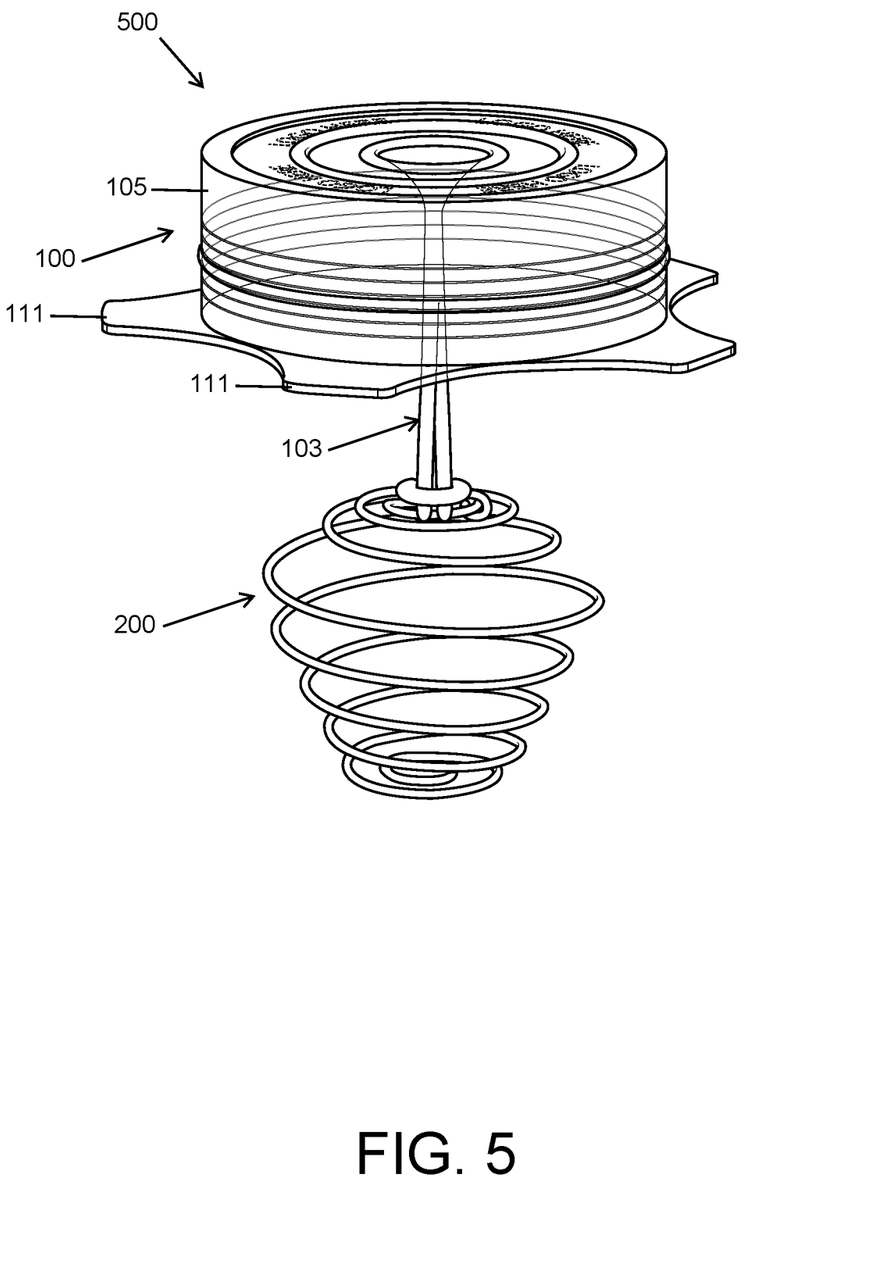
FIG. 5 is a perspective view of an embodiment of a shaker device in accordance with this disclosure.

Referring additionally to FIGS. 2 and 5, in certain embodiments, a shaker device 500 can include a mixing effector 200 attached to or extending from the mixing stalk 103. In certain embodiments, the mixing effector 200 can be a metallic (e.g., stainless steel) wire mixing ball, e.g., as shown. Any suitable shape formed by the mixing effector 200 (e.g., a tear drop wire outline as shown) configured to enhance mixing is contemplated herein. In certain embodiments, the mixing effector 200 can be tied to the mixing stalk 103, e.g., as shown in FIG. 5. Any other suitable mixing effector and/or attachment type is contemplated herein. For example, in certain embodiments, the mixing stalk 103 can form a mixing effector at the end portion 103c such that the mixing effector is integrally formed with the mixing stalk 103.

In certain embodiments, the shaker device 100, 500 can include one or more tabs 111 extending outwardly from the one or more sidewalls 105 to facilitate engaging the cap 101 to the container. Any other suitable additional features for the shaker device 100, 500 are contemplated herein.

The elastic material can be or include at least one of silicone, rubber, or nitrile. Any other suitable material(s) (e.g., elastic, semi-rigid, or rigid) for any suitable portion of any embodiment of the shaker device is/are contemplated herein.

In accordance with at least one aspect of this disclosure, in certain embodiments, a shaker device, e.g., 100 can include an elastic cap (e.g., 101) having an integral elastic mixing stalk (e.g., 103) extending therefrom. The elastic mixing stalk (e.g., 103) can be configured to attach to a mixing effector (e.g., 200). The mixing effector (e.g., 200) can be attached to the mixing stalk (e.g. 103).

In accordance with at least one aspect of this disclosure, a method can include stretching an elastic cap over a lip of a container (e.g., as illustrated in FIG. 7) such that the elastic cap is engaged to and seals an opening of the container and such that a mixing stalk attached to the cap and a mixing effector attached to the mixing stalk is inserted into the container. The method can include shaking the container (e.g., as illustrated in FIG. 8) having the elastic cap engaged to the container to mix contents in the container. The method can include using the mixed contents.

Referring additionally to FIGS. 6-8, embodiments of a shaker device can seal to the top of a cup 600, and can aids in mixing ingredients when the cup 600 is shaken. The cup 600 may be made of any suitable material, e.g., plastic, glass, metal, or ceramic. Embodiments of a shaker device can be made of, e.g., silicone, plastic, rubber or any combination of such materials. Elastic materials can aid on securing the shaker device to the top of the cup by providing compression and friction. Any other method of securing any embodiment of a shaker device to a container is contemplated herein.

Certain embodiments can have the ability to seal onto a cup with a variety of sizes, shapes, styles, materials, and more. Certain embodiments can be relatively small, easy to clean, portable, lightweight, sturdy, durable and long lasting.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A shaker device, comprising:
a cap configured to resiliently fit around at least a portion of a container to seal an opening of the container and to engage the cap to the container to hold the cap to the container; and
a mixing stalk attached to the cap and configured to hang into the container when the cap is sealing the opening of the container;
wherein the mixing stalk includes a base portion extending from the cap, a neck portion extending from the base portion, and an end portion extending from the neck portion;
wherein the base portion is a conical member extending downward from the cap, wherein the neck portion is thinner than the base portion, and wherein the end portion defines a loop shape; and
wherein the mixing stalk is made of an elastic material.

2. The shaker device of claim 1, wherein the cap includes:
one or more sidewalls configured to deform around and resiliently engage a lip of the container to seal against an exterior side wall of the container; and
a top portion connected to the one or more sidewalls to form a cup shape.

3. The shaker device of claim 2, wherein the one or more sidewalls are made of elastic material.

4. The shaker device of claim 1, wherein the cap is entirely made of elastic material.

5. The shaker device of claim 2, wherein the one or more sidewalls include a cylindrical sidewall and the top portion includes a disc.

6. The shaker device of any of claim 2, wherein the mixing stalk is connected to the top portion.

7. The shaker device of claim 1, wherein the mixing stalk is shaped to allow elastic deformation of at least a portion of the mixing stalk in an axis of vibration to cause the mixing stalk to stretch further into the container when the container is shaken to create a reciprocating extension and retraction of the mixing stalk.

8. The shaker device of claim 1, further comprising a mixing effector attached to or extending from the mixing stalk.

9. The shaker device of claim 8, wherein the mixing effector is a metallic wire mixing ball.

10. The shaker device of claim 8, wherein the mixing effector is tied to the mixing stalk.

11. The shaker device of claim 1, wherein the cap includes one or more sidewalls configured to deform around and resiliently engage a lip of the container to seal against an exterior side wall of the container; and
further comprising one or more tabs extending outwardly from the one or more sidewalls to facilitate engaging the cap to the container.

12. The shaker device of claim 3, wherein the elastic material includes at least one of silicone, rubber, or nitrile.

13. The shaker device of claim 1, wherein the cap includes an exterior surface and an interior surface, the interior surface facing an interior of the container and the conical member extends downward from the interior surface.

14. The shaker device of claim 1, wherein the cap is configured to resiliently fit around an opening of the container and a cylindrical exterior sidewall of the container, the cylindrical exterior sidewall defining the opening, by stretching around the cylindrical exterior sidewall and over the opening.

\* \* \* \* \*